United States Patent
Kaplan

[19]

[11] Patent Number: 6,032,039
[45] Date of Patent: Feb. 29, 2000

[54] APPARATUS AND METHOD FOR NOTIFICATION AND RETRIEVAL OF VOICEMAIL MESSAGES IN A WIRELESS COMMUNICATION SYSTEM

[75] Inventor: Diego Kaplan, San Diego, Calif.

[73] Assignee: QUALCOMM Incorporated, San Diego, Calif.

[21] Appl. No.: 08/992,838

[22] Filed: Dec. 17, 1997

[51] Int. Cl.[7] ...................................................... H04Q 7/20
[52] U.S. Cl. .......................................... 455/413; 455/414
[58] Field of Search ..................................... 455/413, 412, 455/414; 379/88.25, 88.27, 88.28

[56] References Cited

U.S. PATENT DOCUMENTS

| | | | |
|---|---|---|---|
| 5,177,780 | 1/1993 | Kasper et al. | 455/413 |
| 5,400,393 | 3/1995 | Knuth et al. | 379/88.28 |
| 5,630,205 | 5/1997 | Ekelund | 455/412 |
| 5,664,009 | 9/1997 | Hurst et al. | 379/88.25 |
| 5,711,011 | 1/1998 | Urs et al. | 455/413 |
| 5,802,466 | 9/1998 | Gallant et al. | 455/413 |
| 5,821,874 | 10/1998 | Parvulescu et al. | 455/413 |
| 5,852,652 | 12/1998 | Matsuoka | 379/88.27 |
| 5,884,160 | 3/1999 | Kanazaki | 455/413 |

FOREIGN PATENT DOCUMENTS

| | | | |
|---|---|---|---|
| 0481683 | 10/1991 | European Pat. Off. | H04Q 7/04 |
| 9103137 | 3/1991 | WIPO | H04Q 7/04 |
| 9214330 | 8/1992 | WIPO | H04M 3/50 |
| 9625817 | 8/1996 | WIPO | H04M 3/50 |

*Primary Examiner*—Edward F. Urban
*Assistant Examiner*—Thuan T. Nguyen
*Attorney, Agent, or Firm*—Philip R. Wadsworth; Raymond B. Hom; Roger W. Martin

[57] ABSTRACT

A wireless communication device provides for voicemail message notification and retrieval in a wireless communication system without the need for an alphanumeric display for the display of text messages on the wireless communication device. A transmitter and receiver communicate with a central message storage area containing one or more voicemail messages intended for the wireless communication device. The central message storage area transmits a voicemail message notification to the wireless communication device whenever there is a change in the number of unread messages stored in the central message storage area. The message notification includes the number of unread messages and may include a callback telephone number to retrieve the voicemail messages.

22 Claims, 5 Drawing Sheets

APPARATUS AND METHOD FOR NOTIFICATION AND RETRIEVAL OF VOICEMAIL MESSAGES IN A WIRELESS COMMUNICATION SYSTEM

BACKGROUND OF THE INVENTION

I. Field of the Invention

The present invention is related generally to a wireless communication device and, more specifically, to an apparatus and method for retrieving voicemail messages in a wireless communication system.

II. Description of the Related Art

Wireless communication devices, such as cellular telephones, are widely used as a replacement for conventional telephone systems. In addition to functioning as a replacement for a conventional telephone, wireless communication devices may be used for text message retrieval and voicemail retrieval. These wireless communication devices, sometimes known as personal communication systems (PCS), require an alphanumeric display in order to display retrieved text messages. The alphanumeric display also provides an indication of voicemail messages awaiting the user. The voicemail messages are stored in a central message storage area and are retrieved by dialing a designated telephone number.

Other wireless communication devices have no alphanumeric displays and are incapable of receiving or retrieving messages. For example, a wireless local loop (WLL) system provides wireless communications in an area where conventional telephone infrastructure is minimal or nonexistent. A WLL system provides basic telephone service without the need for wires to connect individual users to a central telephone exchange. However, the conventional WLL telephone does not include a display and thus has no text messaging or voicemail retrieval capability.

While wireless communication devices, such as PCS devices, offer a variety of communications services, other communication devices, such as a WLL device, do not have such capability. Therefore, it can be appreciated that there is a significant need for an apparatus and method for voice messaging retrieval using a wireless communication device without an alphanumeric text display. The present invention provides this and other advantages, as will be illustrated by the following description and accompanying figures.

SUMMARY OF THE INVENTION

In one embodiment, the present invention is directed to a wireless communication device for voicemail message notification and retrieval wherein the wireless communication device has no alphanumeric display for the display of text messages. The wireless communication device is intended for operation in a wireless communication system that includes a central message storage area. The wireless communication device includes a voicemail message notification processor to detect and process a voicemail message notification from the central message storage area to the wireless communication device. The voicemail message notification includes data indicative of a number of voicemail messages stored in the central message storage area to be forwarded to the wireless communication device. The wireless communication device also includes a storage location to store the data indicative of the number of voicemail messages stored in the central message storage area. A voicemail message notification circuit is selectively enabled when the storage area has a data value greater than zero to provide the user with an indication that at least one voicemail message is stored in the central message storage area to be forwarded to the wireless communication device. The voicemail message notification circuit is selectively disabled when the storage location has a data value equal to zero.

The voicemail message notification circuit can include a light that is selectively enabled to provide a visual indication that voicemail messages are stored in the central message storage area, or an audio signal to provide an audible indication that at least one voicemail message is stored in the central message storage area.

The wireless communication device also includes a callback number storage area to store a predetermined telephone number, such as a service-programmed telephone number, to call to retrieve voicemail messages stored in the central message storage area. The voicemail message notification includes the capability of transmitting a voicemail retrieval callback telephone number along with the voicemail message notification. The wireless communication device includes a dynamic callback number storage area to store the transmitted callback telephone number.

A transmitter transmits a voicemail message retrieval request to retrieve voicemail messages from the central message storage area using the transmitted callback telephone number stored in the dynamic callback number storage area if the voicemail message notification includes a callback telephone number. Otherwise, the transmitter will use the predetermined telephone number stored in the callback number storage area to receive voicemail messages. The voicemail message notification processor may clear the data previously stored in the dynamic callback number storage area if the voicemail message notification does not include the callback telephone number.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Expensive wireless communication devices, such as PCS telephones, offer text messaging as a standard feature. Text messaging requires use of an alphanumeric display. The alphanumeric display typically includes an icon or other indicator to indicate when a text message has been received. The text message is retrieved from a central message storage area and displayed on the alphanumeric display. Similarly, the alphanumeric display includes an icon or other indicator that notifies the user of a waiting voicemail message. The user retrieves the voicemail message from the central message storage area by calling a predetermined telephone number.

The present invention is directed to a technique for voicemail retrieval in a wireless communication device having no alphanumeric display for text messaging or message arrival indication. This is particularly advantageous in low cost systems, such as a WLL system, where individual telephones have no text messaging capability. The present invention is embodied in a wireless communication device 100, illustrated in the functional block diagram of FIG. 1. The wireless communication device 100 can be readily implemented by any wireless communication device, such as a cellular telephone, that has no alphanumeric text messaging capability. However, for the sake of clarity, the following paragraphs describe an implementation of the wireless communication device 100 within a cellular telephone. The wireless communication device 100 advantageously provides voicemail message notification and retrieval in a wireless communication device without requiring expensive alphanumeric displays.

Figure 1:
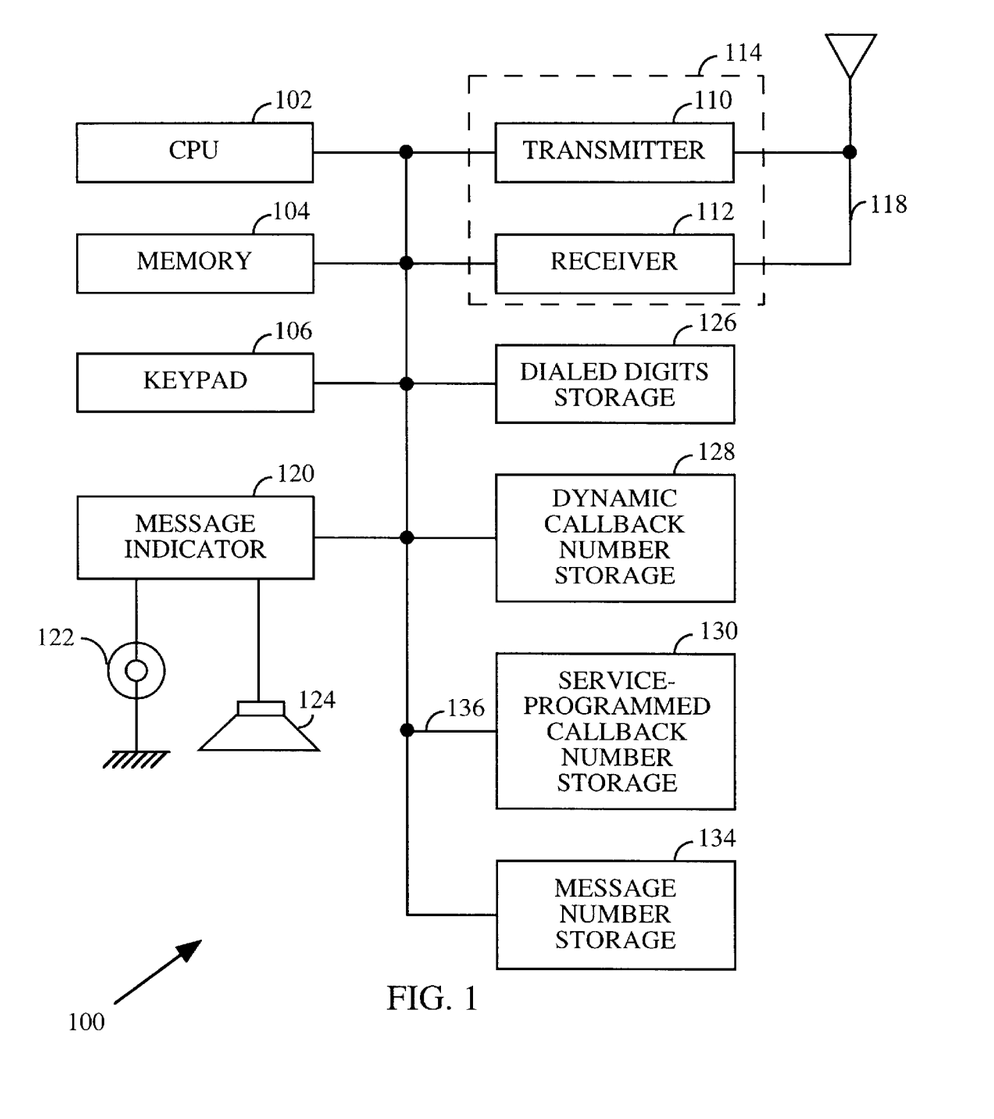
FIG. 1 is a functional block diagram of a wireless communication device designed in accordance with the principles of the present invention.

The wireless communication device 100 includes a central processing unit (CPU) 102 and a memory 104, which may include both read-only memory and random access memory. The random access portion of the memory 104 may also include non-volatile memory. The wireless communication device 100 also includes a keypad 106 operable by the user to control the wireless communication device 100.

Figure 2:
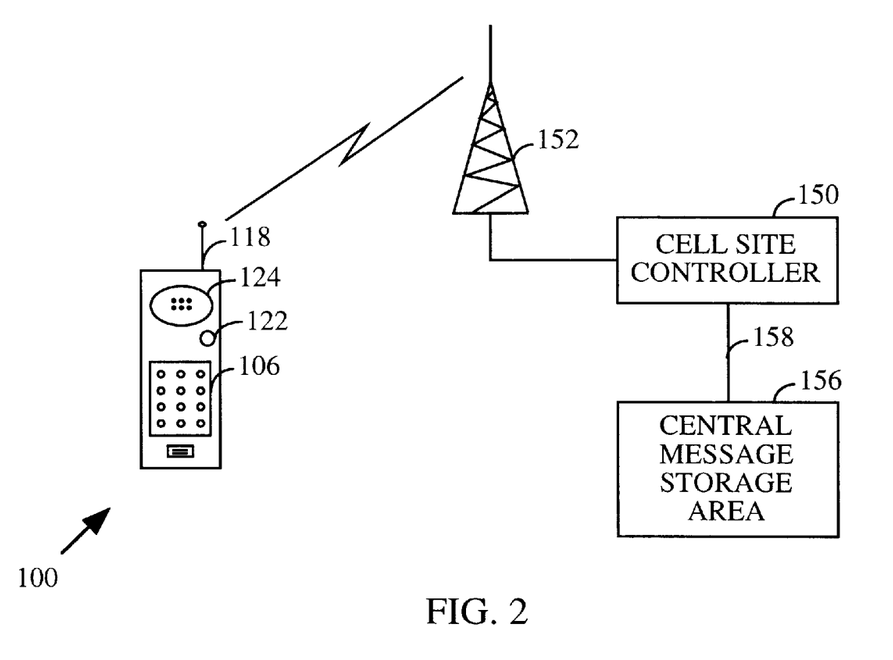
FIG. 2 is a functional block diagram of the operation of the wireless communication device of FIG. 1 to communicate with a central message storage area.

A transmitter 110 and receiver 112 allow transmission and reception of data, such as audio communications, between the wireless communication device 100 and a remote location, such as a cell site controller (see FIG. 2). The transmitter 110 and receiver 112 may be combined into a transceiver 114. An antenna 118 is coupled to the transceiver 114.

Also included in the wireless communication device 100 is a message indicator 120 which provides the user with an indication that one or more voicemail messages have been received and are stored in a central message storage area (see FIG. 2). The message indicator provides the user with a visible and/or audible indication that voicemail messages have been received for the user. In one embodiment, the wireless communication device 100 may include a visual indicator 122 such as a light or blinking LED as a voicemail message arrival indicator. Alternatively, the wireless communication device 100 may include an audible indicator 124, such as a speaker, as a voicemail message arrival indicator. The audible indicator 124 may be implemented using the speaker built into the conventional wireless communication device. Details of the message indicator 120 are provided below.

A dialed digits storage area 126 in the wireless communication device 100 is used to temporarily store a destination telephone number. As is known in the art, the user operates the keypad 106 to enter the desired destination telephone number, which is temporarily stored in the dialed digits storage area 126. When the user presses the Send key (not shown) on the keypad 106, the transmitter 110 transmits the number in the dialed digits storage area 126 to the cell site controller (see FIG. 2). In a WLL system, the wireless communication device 100 typically has no SEND button, but operates in a manner identical to a conventional telephone where the user takes the receiver off the hook and dials the desired destination telephone number. In this embodiment, the wireless communication device 100 need not have the dialed digits storage area 126 to store the entire destination telephone number.

As will be discussed in greater detail below, industry standards provide for message notification in a wireless communication system. In some instances, the message notification includes a callback telephone number that may be used to retrieve the voicemail message. A callback number is a destination telephone number that the user of the wireless communication device 100 may use to retrieve voicemail messages. The wireless communication device 100 includes a dynamic callback number storage area 128 for storage of callback numbers that are transmitted with the voicemail message notification.

The wireless communication device 100 also includes a service-programmed callback number storage area 130 for storage of service-programmed voicemail message retrieval telephone numbers. For example, certain service providers utilize a single voicemail message retrieval telephone number throughout the country. In this embodiment, the service-programmed callback number storage area 130 is programmed with the appropriate number at the time the wireless communication device 100 is initially programmed for operation. The dynamic callback number storage area 128 and the service-programmed callback number storage area 130 may be part of the memory 104. In an exemplary embodiment, the dynamic callback number storage area 128 and the service-programmed callback number storage area 130 are stored in the nonvolatile portion of the memory 104. Alternatively, the dynamic callback number storage area 128 and the service-programmed callback number storage area 130 may be part of the memory 104 designated for speed dialing applications in the wireless communication device 100. The operation of speed dialing memory locations is well known in the art, and will not be described in greater detail herein.

Also included in the wireless communication device 100 is a message number storage area 134. The message number storage area 134 contains a data value indicative of the number of unread voicemail messages awaiting the user of the wireless communication device 100. As will be described in detail below, the voicemail message notification includes a data value indicative of the number of unread messages stored in a central message storage area (see FIG. 2). In an exemplary embodiment, the message number storage area 134 is part of the memory 104 that has been designated for speed dialing applications. The locations in the memory 104 reserved for speed dialing include two digits that are unused and reserved for future applications. The two-digit storage for a selected speed dialing location may be used to record the number of messages awaiting the user of the wireless communication device 100.

The various components of the wireless communication device 100 are coupled together by a bus system 136, which may carry a power bus, control signal bus, and status signal bus in addition to a data bus. However, for the sake of brevity, the various buses are illustrated in FIG. 1 as the bus system 136.

The operation of the wireless communication device 100 to retrieve voicemail messages is illustrated in FIG. 2 as a cellular telephone system. A cell site controller 150 is coupled to a cell site antenna 152. The cell site controller 150 and antenna 152 communicate with the wireless communication device 100 in a conventional fashion, which need not be described herein. The cell site controller is coupled to a central message storage area 156 via a communication link 158. The central message storage area 156 may be at the same physical location as the cell site controller 150 or located remote from the cell site controller. The communication link 158 may be any form of known communication, such as hardwire cable, fiber optic cable, network connection, microwave link, or the like. The present invention is not limited by the specific form of the communication link 158.

A third party can generate a voicemail message for the wireless communication device 100 in a conventional manner, such as by calling the telephone number (i.e., the mobile identification number) of the wireless communication device 100. If the user does not answer the telephone call, or if power is turned off to the wireless communication device 100, the third party caller may leave a voicemail message in the central message storage area 156. Following completion of the voicemail message, the central message storage area 156 generates a voicemail message notification and transmits the voicemail message notification to the wireless communication device 100 via the cell site controller 150 and antenna 152.

In an exemplary embodiment, the voicemail notification message utilizes a data format selected in accordance with one or more industry standards. For example, IS-95A and J-STD-008 provide standards for code division multiple access (CDMA) communication at 800 megahertz and 1900 megahertz, respectively. Each of these industry standards provides a message waiting signal that includes data indicative of the number of messages stored in the central message storage area 156 that have yet to be retrieved by the user. Another standard that can be used in the wireless communication device 100 is the short messaging service (SMS) standard IS-637, which provides a voicemail notification message, including data indicative of the number of messages in the central message storage area 156 that have yet to be retrieved by the user. The SMS standard also provides for a priority level, selected by the message sender, and an optional callback number.

If a callback number is included in the voicemail notification message, the callback number is stored in the dynamic callback number storage area 128 (see FIG. 1). Alternatively, if the voicemail message notification does not include a callback number, voicemail messages may be retrieved from the central message storage area 156 using the service-programmed telephone number in the service-programmed callback number storage area 130. In yet another alternative embodiment, a hardcoded callback number may be included in the program code stored in the read-only portion of the memory 104. In this embodiment, the user may retrieve voicemail messages from the central message storage area 156 by activating a predetermined one of the keys on the keypad 106.

The wireless communication device 100 utilizes a predetermined hierarchy to automatically determine the appropriate callback number for voicemail retrieval. If the wireless communication device 100 includes a hardcoded callback number, the user need only activate a predetermined key on the keypad 106 to cause the wireless communication to retrieve voicemail messages from the central message storage area 156. If no callback number is hardcoded into the wireless communication device 100, the wireless communication device will utilize the transmitted callback number stored in the dynamic callback number storage area 128 or the service-programmed number in the service-programmed number storage area 130. The wireless communication device 100 will only store the callback number from the most recently received voicemail message notification. If a callback telephone number is transmitted along with the voicemail message notification, the wireless communication device 100 saves the transmitted callback number in the dynamic callback number storage area 128 for subsequent voicemail retrieval. If a subsequent voicemail message notification is received and has no callback number, the wireless communication device 100 clears the dynamic callback number storage area 128 so that the wireless communication device does not use outdated callback telephone numbers.

Thus, the wireless communication device 100 will use the callback number in the dynamic callback number storage area 128 if available. If no callback number is present in the dynamic callback number storage area 128, the wireless communication device 100 utilizes the telephone number in the service-programmed callback number storage area 130. Alternatively, the user can manually enter a voicemail retrieval telephone number using the keypad 106.

In normal operation, the desired callback number, whether manually entered via the keypad 106 or recalled from the dynamic callback number storage area 128 or the service-programmed callback number storage area 130, is transferred to the dialed digits storage area 126. The transmitter 110 transmits the dialed digits to the cell site controller 150. Alternatively, the transmitter 110 may transmit the number directly from either the dynamic callback number storage area 128 or the service-programmed callback number storage area 130 to retrieve voicemail messages.

The user retrieves voicemail message from the central message storage area 156 by activating a predetermined key or sequence of keys on the keypad 106. In an exemplary embodiment, the user enters "99*" on the keypad 106 to retrieve voicemail messages. However, other individual keys or key sequences may be readily used by the wireless communication device 100. Accordingly, the present invention is not limited by the specific key or key sequences used to retrieve voicemail messages.

The advantage of the callback telephone number hierarchy described above is that the service provider may program the service-programmed callback number storage area 130 (see FIG. 1) with a fixed telephone number for voicemail message retrieval. However, if the user is in a different geographical area that uses a different callback telephone number, or the service provider wishes to change the callback telephone number, the new callback telephone number may be transmitted as part of the voicemail message notification. The wireless communication device 100 will automatically use the new callback telephone number, which is stored in the dynamic callback number storage area 128. This process is transparent to the user who simply dials the predetermined key sequence (e.g., 99*) to retrieve voicemail messages. The wireless communication device 100 automatically selects the appropriate callback telephone number.

The wireless communication device 100 determines the appropriate voicemail message retrieval number in the manner described above. Once the wireless communication device 100 has established contact with the central message storage area 156, messages may be retrieved using individual keys (not shown) on the keypad 106. Activation of keys to retrieve voicemail messages is well known in the art and need not be described herein. As the user retrieves each voicemail message from the central message storage area 156, the stored message is marked as having been read by the user. When the user has retrieved one or more of the messages from the central message storage area and terminates the call, the central message storage area 156 determines the number of stored messages that have not been read and sends a new voicemail notification message to the wireless communication device 100. If all messages have been read by the user, the voicemail message notification contains a data value of zero to indicate that the central message storage area 156 has no unread voicemail messages for the user. However, if the user did not retrieve all voicemail messages, the voicemail message notification provides an indication to the user that there are still unread voicemail messages contained within the central message storage area 156. It should be noted that the user need not delete voicemail messages from the central message storage area 156. However, the voicemail message notification includes data indicating only the number of voicemail messages that have not been read by the user.

The wireless communication device 100 automatically receives the voicemail notification message when a new message is received in the central message storage area 156 if the wireless communication device is turned on and has registered with the cell site controller 150. Alternatively, the voicemail message notification is sent to the wireless communication device 100 when the wireless communication device is turned on and first registers with the cell cite controller 150. In either case, the wireless communication device 100 will receive the voicemail message notification, including the data indicative of the number of unread voicemail messages in the central message storage area 156. If the number of unread messages is greater than zero, than the message indicator 120 generates an indication that unread messages are awaiting retrieval by the user. The message indicator can selectively activate the visual indicator 122 or the audible indicator 124.

Alternatively, the message indicator 120 can generate an altered dial tone when the user of the wireless communication device 100 places the wireless communication device in an "Off-Hook" state. The term "Off-Hook" refers to the operational state in which a conventional telephone is removed from the hook and a dial tone is generated. With respect to a wireless communication device such as a cellular telephone, the term Off-Hook refers to the operational state in which the "Send" button (not shown) is activated. However, in a WLL system, the wireless communication device 100 is placed in the Off-Hook state simply by picking up the receiver. Thus, the message indicator 120 provides an indication to the user of the wireless communication device 100 that unread voicemail messages are stored in the central message storage area 156.

Figure 3:
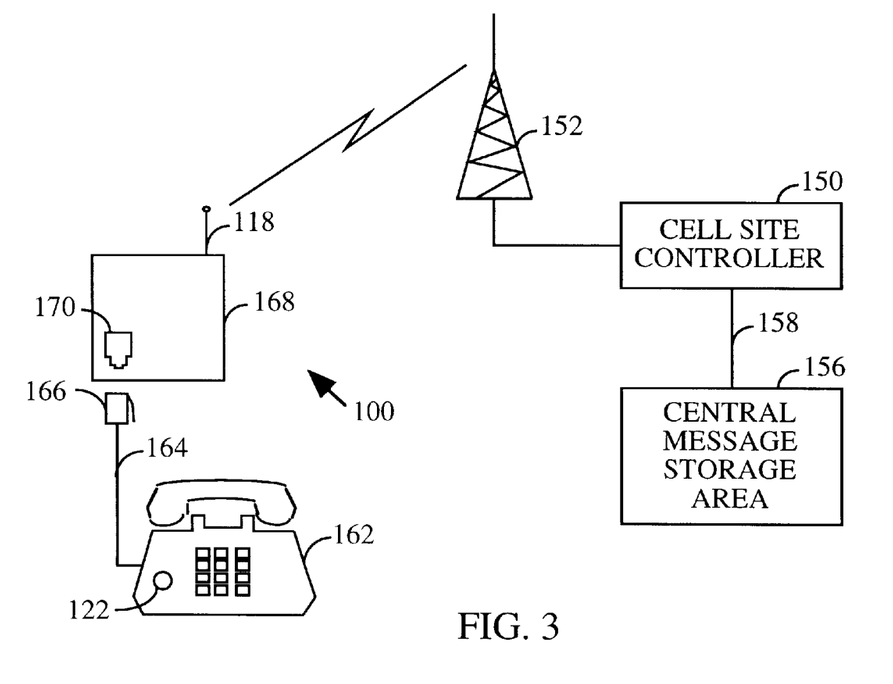
FIG. 3 is a functional block diagram of an alternative embodiment of the operation of the wireless communication device of FIG. 1 to communicate with a central message storage area.

FIG. 2 illustrates the operation of the wireless communication device 100 as a cellular telephone. However, alternative embodiments may be designed in accordance with the principles of the present invention. FIG. 3 illustrates an embodiment of the wireless communication device 100 using a conventional telephone 162, including a telephone cable 164 and industry standard telephone plug 166. The wireless communication device 100 is contained within a wireless adapter 168, which includes the transmitter 110 (see FIG. 1) and receiver 112 as a desktop unit. The wireless adapter 168 includes an industry standard telephone jack 170 to receive the telephone plug 166. The wireless adapter 168 converts the cellular telephone voltages and signals to those used by the conventional telephone 162. The conventional telephone 162 may include the visual indicator 122 to provide an indication to the user that unread voicemail messages are stored in the central message storage area 156.

The user can retrieve the stored voicemail messages in the manner described above. Alternatively, the message indicator 120 can generate an audible signal or generate the altered dial tone when the user picks up the hand set of the conventional telephone 162.

Figure 4:
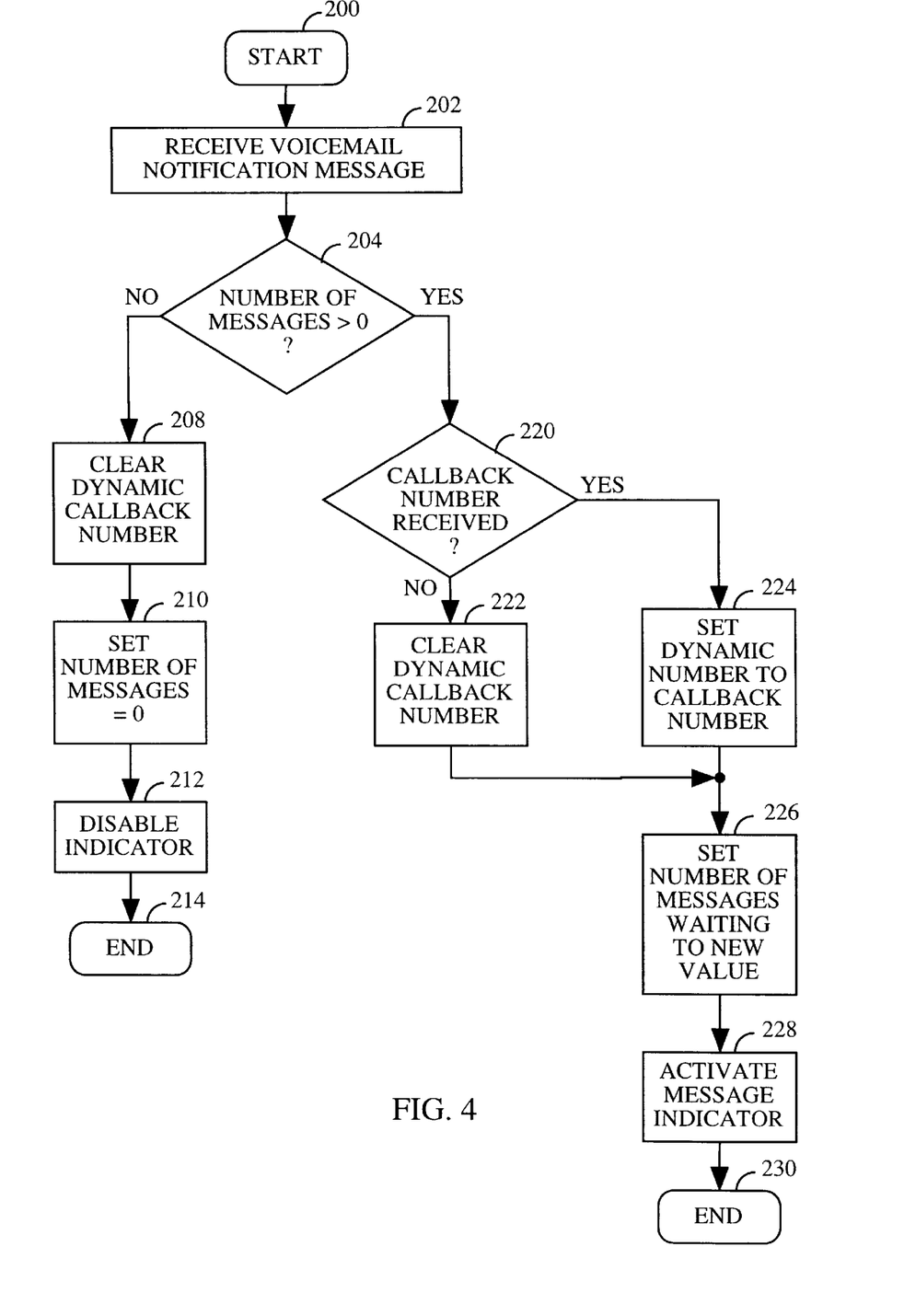
FIG. 4 together form a flowchart of the operation of the system of FIG. 1 to provide voicemail message notification to the user.

The operation of the wireless communication device 100 for voicemail notification is illustrated in the flow chart of FIG. 4. At a start 200, it is assumed that the wireless communication device is turned on and has registered with the cell site controller 150 (see FIGS. 2 and 3). In step 202, the wireless communication device 100 receives the voicemail notification message from the central message storage area 156 via the cell site controller 150 and antenna 152. If the voicemail notification message indicates that the number of unread messages in the central message storage area 156 is greater than zero, the result of decision 204 is YES. If all voicemail messages have been retrieved from the central message storage area 156, the voicemail message notification will indicate a value of zero for the number of unread messages. In that event, the result of decision 204 is NO. If the result of decision 204 is NO, the wireless communication device 100 clears the callback telephone number stored in the dynamic callback number storage area 128 in step 208. In step 210, the wireless communication device 100 sets the number of unread messages equal to zero. In step 212, the system 100 disables the message indicator 120 thus turning off the visual indicator 122 and the audible indicator 124. The process ends at step 214.

If there are unread messages in the central message storage area 156 (see FIGS. 2 and 3), the result of decision 204 is YES. In that event, in decision 220, the wireless communication device 100 determines whether a callback number was received along with the most recent voicemail message notification. If no callback number was received along with the voicemail notification message, the result of decision 220 is NO. In that event, the wireless communication device 100 clears the dynamic callback number storage area 128 in step 222.

In step 226, shown in FIG. 4, the wireless communication device 100 sets the message number storage area 134 to a new value indicative of the number of unread messages in the central message storage area 156. In step 228, the wireless communication device enables the message indicator 120 which, in turn, activates the visual indicator 122 and/or the audible indicator 124 to provide the user with an indication that unread voicemail messages are currently being stored within the central message storage area 156. The process ends at 230.

Returning to FIG. 4, if the voicemail message notification includes a callback number, the result of decision 220 is YES. In that event, in step 224, shown in FIG. 4, the wireless communication device 100 stores the callback number from the voicemail message notification in the dynamic callback number storage area 128. Following step 224, the wireless communication device 100 sets the message number storage area 134 equal to the value of unread messages in the central message storage area 156 in step 226. In step 228, the wireless communication device enables the message indicator 120 which, in turn, activates the visual indicator 122 and/or the audible indicator 124 to provide the user with an indication that unread voicemail messages are currently being stored within the central message storage area 156. The process ends at 230.

Figure 5:
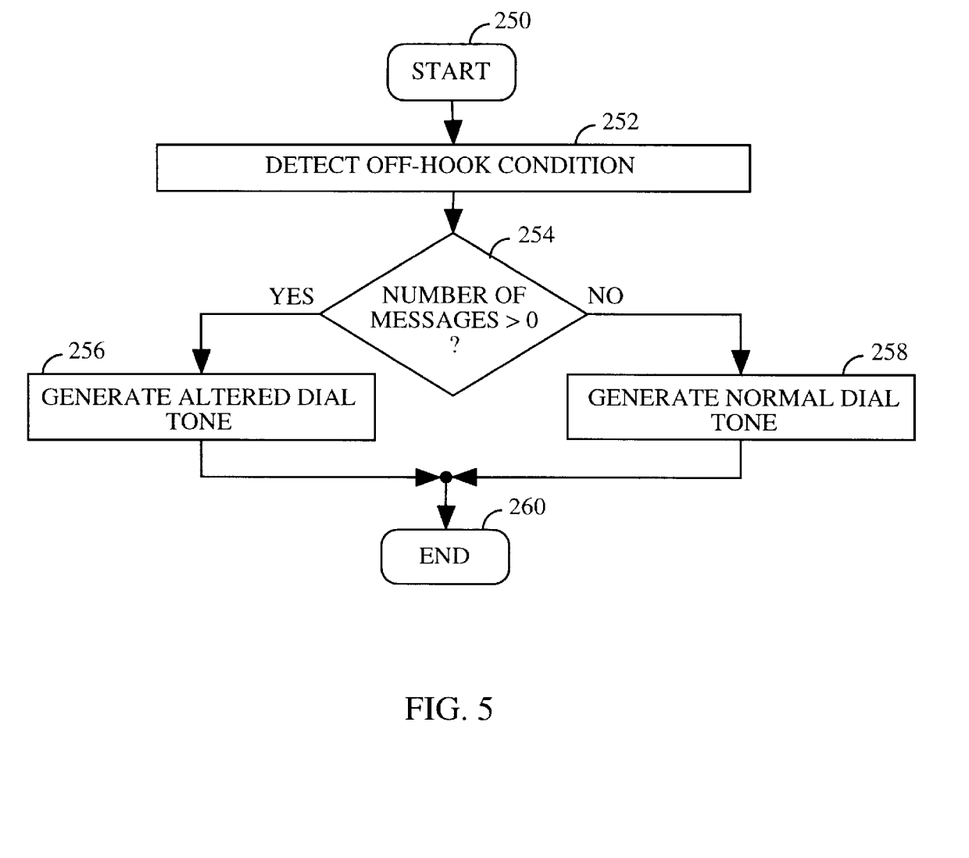
FIG. 5 is a flowchart of the operation of the wireless communication device of FIG. 1 to provide an alternative voicemail message notification to the user.

An alternative voicemail message notification is illustrated in the flowchart of FIG. 5. At a start 250, it is assumed that a voicemail message notification has already been received by the wireless communication device 100. In step 252, the wireless communication device 100 detects an Off-Hook condition. In decision 254, the wireless communication device 100 determines whether the number of messages in the message number storage area 134 (see FIG. 1) is greater than zero. If there are unread messages stored in the central message storage area (see FIGS. 2 and 3), the result of decision 254 is YES. In that event, in step 256, the message indicator 120 generates an altered dial tone to provide the user with an audible indication that unread voicemail messages are awaiting retrieval by the user. The wireless communication device 100 ends the process at 260. If there are no unread messages in the central message storage area 156, the message number storage area 134 of the wireless communication device 100 will have a value of zero. In that event, the result of decision 254 is NO. As a result, the wireless communication device 100 will generate a normal dial tone in step 258 when an Off-Hook condition occurs. Again, the process ends at 260.

Figure 6:
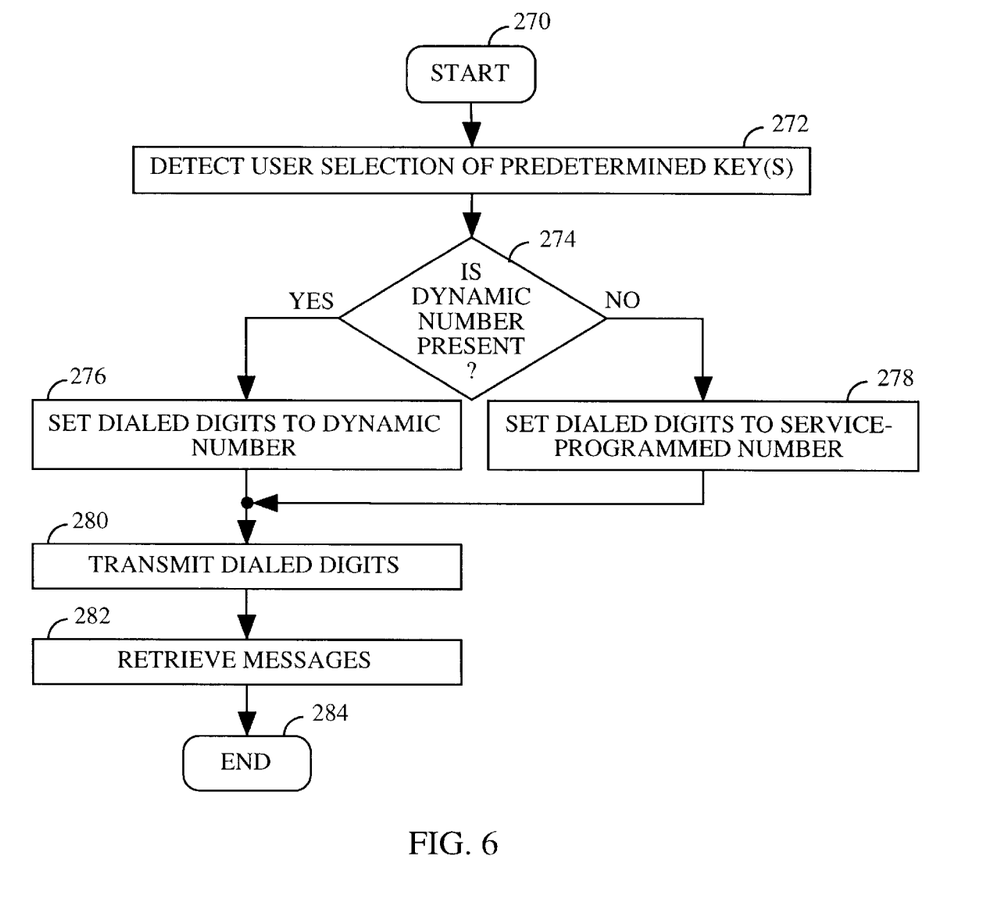
FIG. 6 is a flowchart of the operation of the wireless communication device of FIG. 1 to retrieve voicemail messages from the central message storage area.

The operation of the wireless communication device 100 to retrieve voicemail messages is illustrated in the flowchart of FIG. 6. At a start 270 it is assumed that the wireless communication device 100 is turned on and has registered with the cell site controller 150 (see FIGS. 2 and 3). In step 272, the wireless communication device 100 detects the user selection of the predetermined key sequence on the keypad 106. As previously discussed, many different forms of keypad button sequences may be used as the predetermined key sequence. In the exemplary embodiment described herein, 99* is selected as the predetermined key sequence.

When the predetermined key sequence is detected in step 272, the wireless communication device 100 determines whether a callback number is present in the dynamic callback number storage area 128 (see FIG. 1) in decision 274. If a callback number is present in the dynamic callback number storage area 128, the result of decision 274 is YES and, in step 276, the wireless communication device sets the dialed digits storage area 126 equal to the number in the dynamic callback number storage area 128. If no number is present in the dynamic callback area number storage 128, the result of decision 274 is NO, and in step 278, the wireless communication device 100 sets the dialed digits storage area 126 equal to the number in the service-programmed callback number storage area 130.

Following the completion of either step 276 or step 278, the wireless communication device 100 transmits the callback number in the dialed digits storage area 126 in step 280. It should be noted that the proper execution of step 280 requires that the user place the wireless communication device in the Off-Hook mode by activating the Send button (not shown) if the wireless communication device 100 is a cellular telephone. If implemented in a WLL system, the user places the wireless communication device in the Off-Hook state by picking up the receiver prior to step 272 detecting user entry of the predetermined keys. Thus, step 280 automatically transmits the selected callback number when the user enters the predetermined keys. In either implementation, the transmitter 110 (see FIG. 1) transmits the digits and the dialed digits storage area 126 to the cell site controller 150.

The cell site controller 150 establishes communication with the central message storage area 156 via the communication link 158. When a connection has been established between the wireless communication device 100 and the central message storage area 156, the wireless communication device can retrieve one or more stored messages from the central message storage area 156 in step 282. The process ends at 284 when the user terminates the connection between the wireless communication device 100 and the central message storage area 156.

Thus, the wireless communication device 100 provides the capability of simple voicemail message notification and retrieval without the need for an expensive alphanumeric display. This technique is particularly useful in systems, such as a WLL system, where conventional telephones may be used with wireless adapters.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A wireless communication device for voicemail message notification and retrieval in a wireless communication system including a central message storage area using a wireless communication device with no alphanumeric display for the display of text messages, the wireless communication device comprising:

an antenna to detect wireless transmissions from a location remote from the wireless communication device;

a receiver coupled to the antenna to receive a wireless communication message based on the detected wireless transmissions, the wireless communication message having a predetermined format including data indicative of a number of voicemail messages stored in the central message storage area for the wireless communication device and including a data portion for transmitted data indicative of a dynamic callback telephone number to call to retrieve voicemail messages stored in the central message storage area for the wireless communication device;

a storage location to store the data indicative of the number of voicemail messages stored in the central message storage area for the wireless communication device;

a voicemail message notification circuit, selectively enabled when the storage location has a data value greater than zero to provide the user with an indication that at least one voicemail message is stored in the central message storage area for the wireless communication device, the voicemail message notification circuit being selectively disabled when the storage location has a data value equal to zero;

a first callback number storage area to store preprogrammed data indicative of a predetermined callback telephone number to call to retrieve voicemail messages stored in the central message storage area for the wireless communication device;

a second callback number storage area to store the transmitted data indicative of the dynamic callback telephone number to call to retrieve voicemail messages stored in the central message storage area for the wireless communication device if transmitted in the wireless communication message; and a transmitter coupled to the antenna to transmit a voicemail message retrieval request to retrieve voicemail messages from the central message storage area, the transmitter using the dynamic callback telephone number to retrieve voicemail messages from the central message storage area if transmitted in the wireless communication message and using the predetermined callback telephone number if the wireless communication message does not contain the transmitted data in the wireless communication message.

2. The wireless communication device of claim 1 wherein the voicemail message notification circuit includes a blinking light selectively enabled when the storage location has a data value greater than zero to provide the user with a visual indication that at least one voicemail message is stored in the central message storage area for the wireless communication device.

3. The wireless communication device of claim 1 wherein the message notification circuit includes an audio signal selectively enabled when the storage location has a data value greater than zero to provide the user with an audible indication that at least one voicemail message is stored in the central message storage area for the wireless communication device.

4. The wireless communication device of claim 3 wherein the audio signal is an altered dial tone.

5. The wireless communication device of claim 1, further including a speed dial storage area wherein the storage location to store the data indicative of a number of voicemail messages stored in the central message storage area is a portion of the speed dial storage area.

6. The wireless communication device of claim 1, further including a keypad operable by a user and a processor coupled to the keypad and responsive to user activation of keys on the keypad in a predetermined sequence, the processor activating the transmitter to transmit the voicemail message retrieval request in response to user activation of the predetermined sequence of keys on the keypad.

7. The wireless communication device of claim 1 wherein the predetermined callback telephone number stored in the first callback number storage area is a service-programmed callback telephone number.

8. The wireless communication device of claim 1, further including a processor to clear the dynamic callback telephone number stored in the second callback number storage area if the wireless communication message does not include the transmitted data.

9. The wireless communication device of claim 8, further including a speed dial storage area wherein the second callback number storage area is a portion of the speed dial storage area.

10. A wireless communication device for voicemail message notification and retrieval in a wireless communication system including a central message storage area, the wireless communication device comprising:

a voicemail message notification processor to detect and process a voicemail message notification from the central message storage area to the wireless communication device, the voicemail message notification including voicemail retrieval callback telephone number capability optionally containing a transmitted callback telephone number;

a dynamic callback number storage area to store the transmitted callback telephone number if transmitted with the voicemail message notification;

a predetermined callback number storage area to store a predetermined telephone number to call to retrieve voicemail messages stored in the central message storage area for the wireless communication device; and a transmitter to transmit a voicemail message retrieval request to retrieve voicemail messages from the central message storage area, the transmitter using the transmitted callback telephone number stored in the dynamic callback number storage area to retrieve voicemail messages from the central message storage area if such dynamic callback number was transmitted with the voicemail message notification and using the predetermined telephone number stored in the predetermined callback number storage area to retrieve voicemail messages from the central message storage area if the voicemail message notification does not include the transmitted callback telephone number.

11. The wireless communication device of claim 10 wherein the voicemail message notification circuit is selectively disabled when the storage location has a data value equal to zero.

12. The wireless communication device of claim 10, further including a keypad operable by a user and a processor coupled to the keypad and responsive to user activation of keys on the keypad in a predetermined sequence, the processor activating the transmitter to transmit the voicemail message retrieval request in response to user activation of the predetermined sequence of keys on the keypad.

13. The wireless communication device of claim 10 wherein the voicemail message notification circuit includes a light selectively enabled when the storage location has a data value greater than zero to provide the user with a visual indication that at least one voicemail message is stored in the central message storage area to be forwarded to the wireless communication device.

14. The wireless communication device of claim 10 wherein the message notification circuit includes an audio signal selectively enabled when the storage location has a data value greater than zero to provide the user with an audible indication that at least one voicemail message is stored in the central message storage area to be forwarded to the wireless communication device.

15. The wireless communication device of claim 10 wherein the voicemail message notification processor clears data stored in the dynamic callback number storage area if the voicemail message notification does not include the callback telephone number, the transmitter using the telephone number stored in the predetermined callback number storage area to retrieve voicemail messages from the central message storage area.

16. A method using a wireless communication device for voicemail message notification and retrieval in a wireless communication system including a central message storage area using a wireless communication device with no alphanumeric display for the display of text messages, the method comprising the steps of:

storing a predetermined callback telephone number to call to retrieve voicemail messages stored in the central message storage area for the wireless communication device;

detecting a voicemail message notification from the central message storage area to the wireless communication device, the voicemail message notification including voicemail retrieval callback telephone number capability optionally containing a transmitted callback telephone number;

storing the transmitted callback telephone number if transmitted with the voicemail message notification; and transmitting a voicemail message retrieval request using the stored transmitted callback telephone number to retrieve voicemail messages from the central message storage area;

if the voicemail message notification does not include a transmitted voicemail retrieval callback telephone number, transmitting a voicemail message retrieval request using the predetermined callback telephone number to retrieve voicemail messages from the central message storage area.

17. The method of claim 16, further including the step of selectively disabling the message indicator when the stored data has a data value equal to zero.

18. The method of claim 16 wherein the predetermined callback telephone number is a service-programmed callback telephone number.

19. The method of claim 16, further including the step of sensing user operation of a keypad to activate keys on the keypad in a predetermined sequence, the step of transmitting the voicemail message retrieval request being performed in response to user activation of the predetermined sequence of keys on the keypad.

20. The method of claim 16 wherein message indicator includes a light and the step of selectively enabling the message indicator includes the step of turning on the light.

21. The method of claim 16 wherein message indicator includes a sound source and the step of selectively enabling the message indicator includes the step of generating an audible signal using the sound source.

22. The method of claim 16, further including the step of clearing the stored transmitted callback telephone number if a subsequently received voicemail message notification does not include a transmitted callback telephone number, the step of transmitting using the stored predetermined telephone number to retrieve voicemail messages from the central message storage area.

\* \* \* \* \*